US012666485B2

(12) United States Patent
Wu et al.

(10) Patent No.: US 12,666,485 B2
(45) Date of Patent: Jun. 23, 2026

(54) EFFICIENT USE OF PHYSICAL AND LOGICAL RESOURCES IN DUAL CONNECTIVITY

(71) Applicant: GOOGLE LLC, Mountain View, CA (US)

(72) Inventors: Chih-Hsiang Wu, Taoyuan City (TW); Ching-Jung Hsieh, Taipei City (TW)

(73) Assignee: GOOGLE LLC, Mountain View, CA (US)

( * ) Notice: Subject to any disclaimer, the term of this patent is extended or adjusted under 35 U.S.C. 154(b) by 184 days.

(21) Appl. No.: 17/636,024

(22) PCT Filed: Aug. 14, 2020

(86) PCT No.: PCT/US2020/046477
§ 371 (c)(1),
(2) Date: Feb. 16, 2022

(87) PCT Pub. No.: WO2021/034704
PCT Pub. Date: Feb. 25, 2021

(65) Prior Publication Data
US 2022/0287135 A1     Sep. 8, 2022

Related U.S. Application Data

(60) Provisional application No. 62/888,396, filed on Aug. 16, 2019.

(51) Int. Cl.
*H04W 76/19*          (2018.01)
*H04W 76/15*          (2018.01)
(Continued)

(52) U.S. Cl.
CPC ........... *H04W 76/19* (2018.02); *H04W 76/15* (2018.02); *H04W 76/20* (2018.02); *H04W 76/30* (2018.02); *H04W 76/27* (2018.02)

(58) Field of Classification Search
CPC .............................. H04W 76/15; H04W 76/30
(Continued)

(56) References Cited

U.S. PATENT DOCUMENTS

2018/0184343 A1      6/2018  Xu et al.
2018/0270713 A1*     9/2018  Park ...................... H04L 5/0053
(Continued)

FOREIGN PATENT DOCUMENTS

WO      WO-2019/027296 A1     2/2019
WO      WO-2019/031948 A1     2/2019

OTHER PUBLICATIONS

International Search Report and Written Opinion for Application No. PCT/US2020/046477, dated Dec. 16, 2020.
Qualcomm Incorporated, "Paging and Mobility for MR-DC with RRC Inactive," 3GPP Draft (2019).
(Continued)

*Primary Examiner* — Charles N Appiah
*Assistant Examiner* — Frank E Donado
(74) *Attorney, Agent, or Firm* — MARSHALL, GERSTEIN & BORUN LLP

(57) ABSTRACT
A radio access network (RAN) manages resources associated with a user equipment (UE) operating in dual connectivity (DC) with a master node (MN) and a secondary node (SN) in accordance with an initial configuration of a radio connection between the UE and the RAN (1102). The RAN detects that traffic of the UE is inactive on a radio bearer via which the UE communicates with the SN (1104). In response to the detecting, the RAN sends to the UE a command to transition from a connected state to an inactive state in which the radio connection is suspended, including one of (i) sending the command while the UE operates in accordance with the initial configuration of the radio connection (1120), or (ii) configuring the radio bearer to be terminated only at the MN (1110).

20 Claims, 9 Drawing Sheets

(51) Int. Cl.
| | | |
|---|---|---|
| *H04W 76/20* | (2018.01) | |
| *H04W 76/30* | (2018.01) | |
| *H04W 76/27* | (2018.01) | |

(58) Field of Classification Search
USPC ......................................... 370/329, 331, 312
See application file for complete search history.

(56) References Cited

U.S. PATENT DOCUMENTS

| | | | |
|---|---|---|---|
| 2018/0368205 A1* | 12/2018 | Park ...................... | H04W 76/30 |
| 2019/0028170 A1 | 1/2019 | Zhang et al. | |
| 2019/0045564 A1 | 2/2019 | Hayashi | |
| 2019/0174421 A1 | 6/2019 | Quan et al. | |
| 2019/0387569 A1 | 12/2019 | Martinez Tarradell et al. | |
| 2020/0214073 A1* | 7/2020 | Shimoda ............... | H04W 76/27 |
| 2022/0279620 A1* | 9/2022 | Rugeland .............. | H04W 76/34 |
| 2024/0414803 A1* | 12/2024 | Cheng ................... | H04W 24/10 |

OTHER PUBLICATIONS

"5G; NG-RAN; Architecture Description," 3GPP TS 38.401 version 15.7.0 Release 17 (2020).
"LTE: Evolved Universal Terrestrial Radio Access (E-UTRA) and Evolved Universal Terrestrial Radio Access Network (E-UTRAN); Overall Description; Stage 2," 3GPP TS 36.300 version 15.9.0 Release 15 (2020).
"LTE; Evolved Universal Terrestrial Radio Access Network (E-UTRAN); X2 Application Protocol (X2AP)," 3GPP TS 36.423 version 15.9.0 Release 15 (2020).
"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 (2019).
"3rd Generation Partnership Project; Technical Specification Group Radio Access Network; NR; Radio Resource Control (RRC) protocol specification (Release 15)," 3GPP TS 38.331 (2021).

* cited by examiner

700 ⟶

800 ⮕

900 ⬎

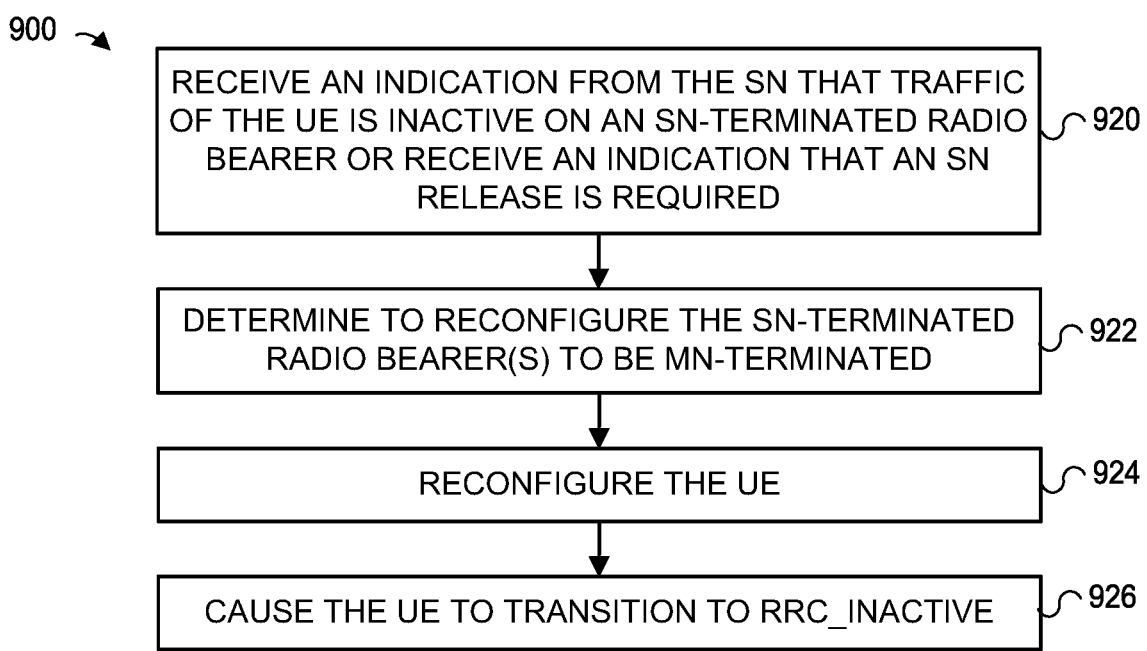

RECEIVE AN INDICATION FROM THE SN THAT TRAFFIC OF THE UE IS INACTIVE ON AN SN-TERMINATED RADIO BEARER OR RECEIVE AN INDICATION THAT AN SN RELEASE IS REQUIRED ⟿920

DETERMINE TO RECONFIGURE THE SN-TERMINATED RADIO BEARER(S) TO BE MN-TERMINATED ⟿922

RECONFIGURE THE UE ⟿924

CAUSE THE UE TO TRANSITION TO RRC_INACTIVE ⟿926

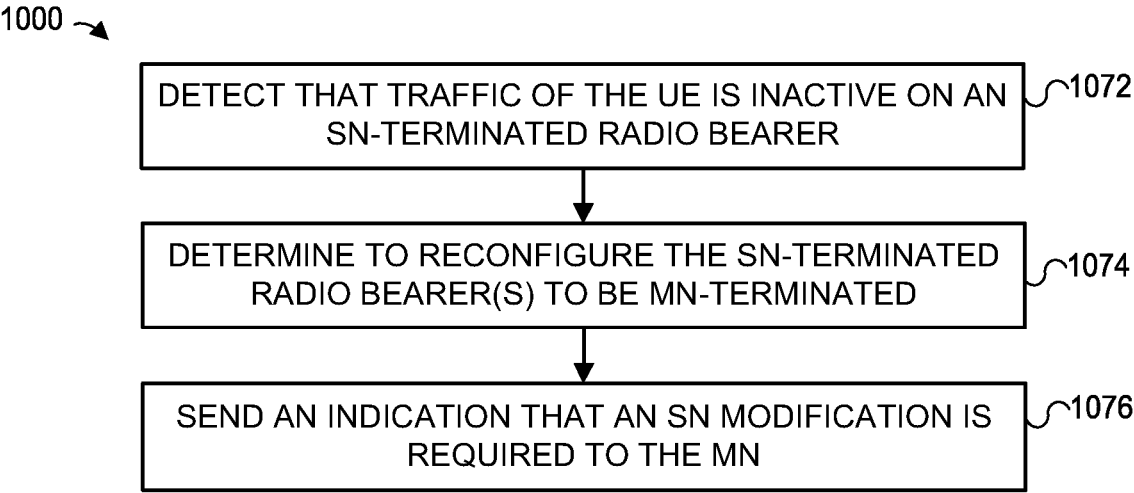

DETECT THAT TRAFFIC OF THE UE IS INACTIVE ON AN SN-TERMINATED RADIO BEARER ⟿1072

DETERMINE TO RECONFIGURE THE SN-TERMINATED RADIO BEARER(S) TO BE MN-TERMINATED ⟿1074

SEND AN INDICATION THAT AN SN MODIFICATION IS REQUIRED TO THE MN ⟿1076

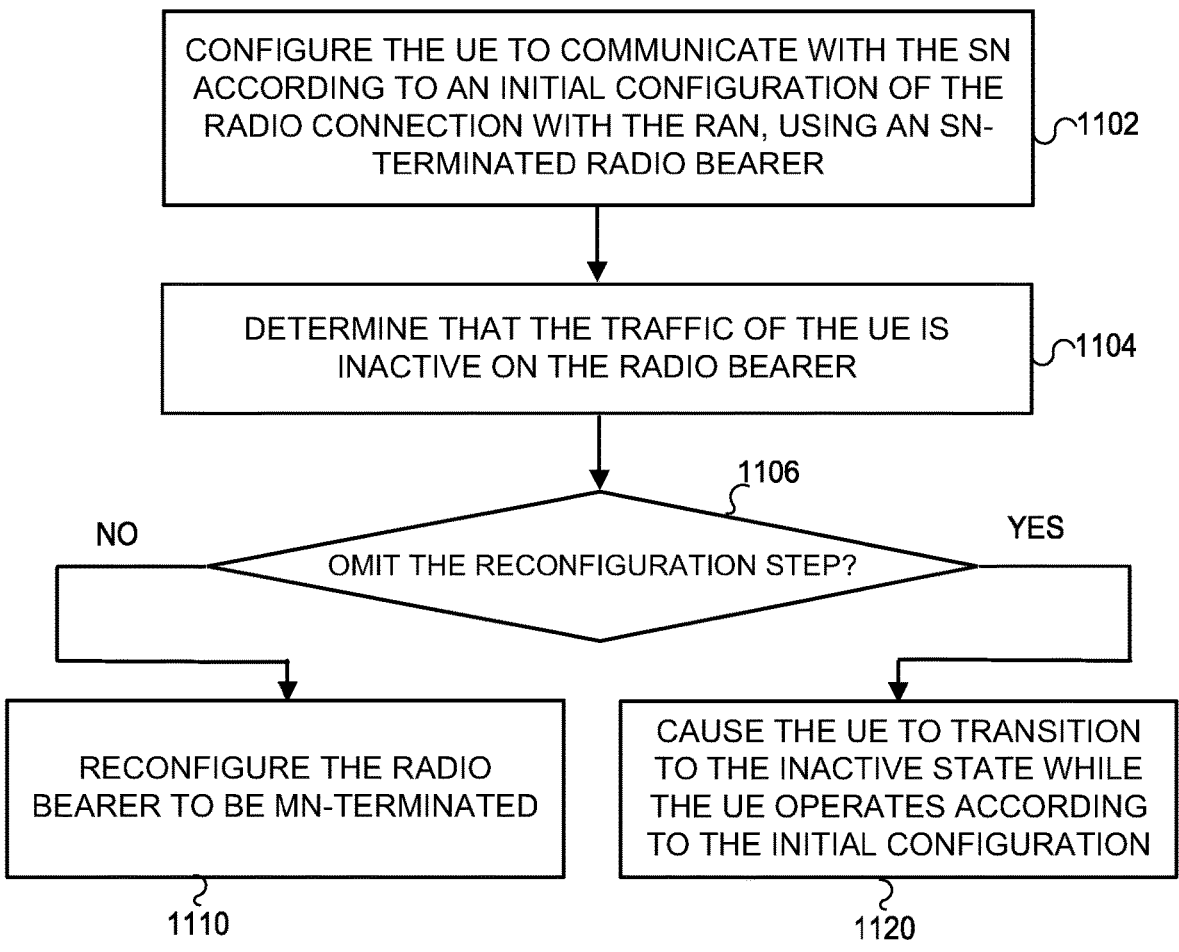

CONFIGURE THE UE TO COMMUNICATE WITH THE SN ACCORDING TO AN INITIAL CONFIGURATION OF THE RADIO CONNECTION WITH THE RAN, USING AN SN-TERMINATED RADIO BEARER ⌒1102

DETERMINE THAT THE TRAFFIC OF THE UE IS INACTIVE ON THE RADIO BEARER ⌒1104

1106

OMIT THE RECONFIGURATION STEP?

NO                                                                              YES

RECONFIGURE THE RADIO BEARER TO BE MN-TERMINATED
1110

CAUSE THE UE TO TRANSITION TO THE INACTIVE STATE WHILE THE UE OPERATES ACCORDING TO THE INITIAL CONFIGURATION
1120

Figure 11

EFFICIENT USE OF PHYSICAL AND LOGICAL RESOURCES IN DUAL CONNECTIVITY

FIELD OF THE DISCLOSURE

This disclosure relates generally to wireless communications and, more particularly, to managing physical and logical resources in dual connectivity of a user device.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When a user equipment (UE) operates in dual connectivity (DC) with a master node (MN) and a secondary node (SN) of a radio access network (RAN), the UE communicates data with the SN over an SN-terminated radio bearer. The radio bearer can be a signaling radio bearer (SRB) or a data radio bearer (DRB), for example. In general, a radio bearer can include, or be associated with, lower-layer resources at the physical (PHY) layer, media access control (MAC) layer, and/or radio link control (RLC) layer, as well as higher-layer resources such as user-plane and/or control-plane contexts.

The SN can determine in some cases that the UE has not been actively transmitting or receiving on an SN-terminated bearer and, in response, can initiate the release of the lower-layer resources associated with the radio bearer. In particular, the RAN in this case can cause the UE to transition from the connected state (e.g., RRC_CONNECTED) to the inactive state (e.g., RRC_INACTIVE) and suspend the radio connection. Because the UE in the inactive state may transition back to the connected state within a certain amount of time, in contrast to the idle state (e.g., RRC_IDLE) where there is no expectation of the UE imminently resuming the radio connection and thus no need for the UE to retain radio resources, the SN initiates the release of only the lower-layer resources and retains the higher-layer resources of the radio bearer. This approach allows the UE to more quickly re-acquire the necessary resources once the UE transitions back to the connected state.

However, the existing techniques do not always result in an efficient use of radio resources or logical resources such as identifiers, context descriptions, etc. For example, after the SN indicates the release of lower layers of the radio bearer, the RAN initiates a procedure for reconfiguring the radio connection. The UE continues to operate in the connected state and consumes power by frequently monitoring downlink signals and transmitting uplink signals such as channel quality indicators. The MN then determines, based on the SN reporting inactivity of the UE, that the UE should transition to the inactive state, and sends a corresponding command to the UE. Further, the UE may remain in the inactive state for a relatively long time, and during this time the SN retains the higher-layer resources of the radio bearer.

SUMMARY

The RAN of this disclosure efficiently manages physical and/or logical resources associated with a UE that operates in DC with an MN and an SN. According to some of these techniques, the RAN suspends the radio connection between the UE and the RAN while the UE operates in accordance with the initial configuration of the radio connection. In other words, when the RAN determines that the UE should transition to the inactive state, the RAN does not reconfigure the radio connection prior to sending a command to the UE to transition to the inactive state. The MN and/or the SN can execute these techniques in different implementations. In one example implementation, the MN receives an SN RRC message from the SN and determines to not forward this message to the UE. In another example implementation, the SN determines to not include an SN RRC message in a message to the MN.

Further, according to another technique of this disclosure, the RAN re-configures the SN-radio bearer to be MN-terminated, to thereby release the resources of the SN related to this radio bearer. The MN and/or the SN can initiate the reconfiguration of the radio bearer in various implementations. For example, the MN can determine to reconfigure the radio bearer in response to receiving an indication of inactivity of the UE from the SN. As another example, the MN can determine to reconfigure the radio bearer in response to receiving a request to release the SN, from the SN. As yet another example, the SN can initiate the reconfiguration of the radio bearer and inform the MN accordingly, in response to detecting inactivity of the UE.

An example embodiment of these techniques is a method in a RAN for managing resources associated with a UE operating in dual connectivity with an MN and an SN in accordance with an initial configuration of a radio connection between the UE and the RAN. The method includes detecting that traffic of the UE is inactive on a radio bearer via which the UE communicates with the SN and, in response to the detecting, sending to the UE a command to transition from a connected state to an inactive state in which the radio connection is suspended. Sending the command includes one of sending the command while the UE operates in accordance with the initial configuration of the radio connection, or configuring the radio bearer to be terminated only at the MN.

Another example embodiment of these techniques is a RAN including a first base station operating as an MN in DC communication with a UE and a second base station operating as an SN in the DC communication with the UE. The RAN is configured to implement the method above.

Yet another example embodiment of these techniques is a method in a base station operating as an MN for a UE communicating in DC with the MN and an SN. The method includes receiving a base station message from the SN including a second message for the UE, where the message is associated with a protocol for controlling radio resources. The method further includes determining whether the UE should transition to an inactive state from a connected state. In response to determining that the UE should not transition to the inactive state, the method includes transmitting the second message to the UE over a radio interface. In response to determining that the UE should transition to the inactive state, the method includes transmitting a command to transition to the inactive state over the radio interface, including discarding the second message.

Still another example embodiment of these techniques is a method in a base station operating as an SN for a UE communicating in DC with an MN and the SN. The method includes receiving, from the MN, a request to modify a radio connection between the UE and the SN and generating an acknowledgement message responsive to the request. The generating includes, in response to determining that the request does not include a command to release lower layers of the radio bearer, including in the acknowledgement message a second message to be forwarded to the UE. In response to determining that the request includes a command to release the lower layers of the radio bearer, the generating includes omitting the second message from the acknowledgement message.

Another example embodiment of these techniques is a method in a base station operating as an SN for a UE communicating in DC with an MN and the SN. The method includes detecting that the UE is inactive on an SN-terminated radio bearer and, in response to the detecting, determining that the SN-terminated radio bearer should be reconfigured to be an MN-terminated radio bearer. The method further includes sending an indication to the MN that a reconfiguration of the SN-terminated bearer is required.

Another example embodiment of these techniques is a base station including processing hardware and configured to implement one of the methods above.

BRIEF DESCRIPTION OF THE DRAWINGS

FIG. 9 is a flow diagram of an example method for reconfiguring an SN-terminated bearer associated with a UE transitioning from the connected state to the inactive state, which can be implemented in the MN of FIG. 1;

FIG. 10 is a flow diagram of an example method for reconfiguring an SN-terminated bearer associated with a UE transitioning from the connected state to the inactive state, which can be implemented in the SN of FIG. 1; and FIG. 11 is a flow diagram of an example method for managing resources of a UE transitioning from the connected state to the inactive state, which can be implemented in the radio access network (RAN) of FIG. 1.

DETAILED DESCRIPTION OF THE DRAWINGS

Figure 1:
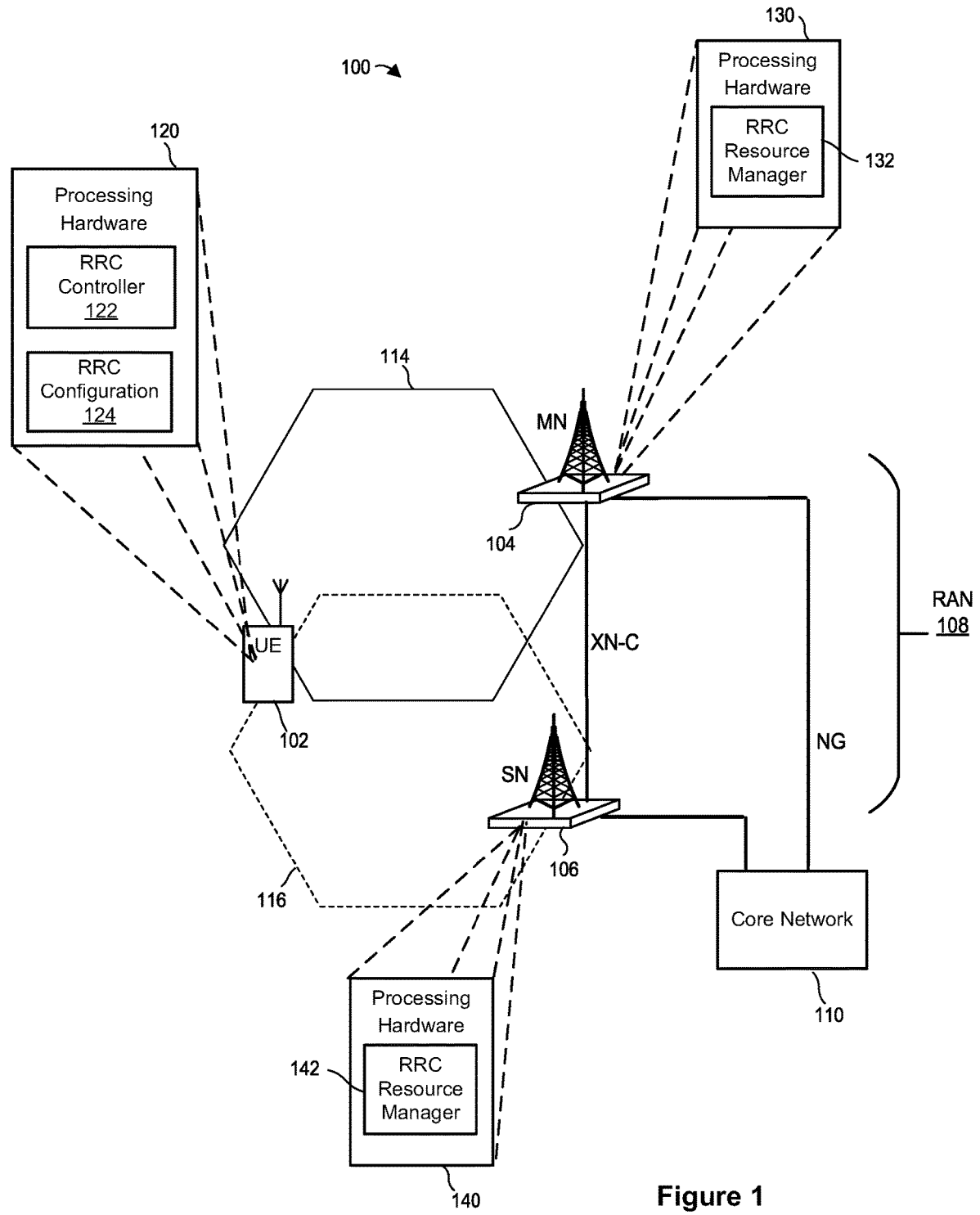
FIG. 1 is a block diagram of an example system in which one or more base stations can implement the techniques of this disclosure for managing resources associated with a user equipment (UE) operating in dual connectivity (DC) with a master node (MN) and a secondary node (SN)

FIG. 1 depicts an example wireless communication network 100 in which an example UE 102 operates in dual connectivity with an MN 104 and an SN 106 of a RAN 108. The MN 104 and/or the SN 106 implement the techniques of this disclosure for efficiently managing physical and logical resources, as discussed in detail below.

The base station 104 can be implemented as a master evolved Node B (MeNB) or a master 5G Node B (MgNB) node, and the base station 106 can be implemented as a secondary gNB (SgNB) or a secondary eNB (SeNB) node. In the scenarios of this disclosure, the UE 102 concurrently communicates with the base station 104 and the base station 106 via different RATs (Universal Terrestrial Radio Access (EUTRA) and New Radio (NR)), and thus operates in multi-radio dual connectivity (MR-DC). For example, when the base station 104 is an Mng-eNB and the base station 106 is a SgNB, the UE 102 may be in next generation (NG) EUTRA-NR DC (NGEN-DC) with the Mng-eNB and the SgNB. When the base station 104 is an MgNB and the base station 106 is an Sng-eNB, the UE 102 may be in NR-EUTRA DC (NE-DC) with the MgNB and the Sng-eNB. In general, however, at least some of these techniques also can apply to situations where the UE concurrently communicates in DC with two base stations via the same RAT.

The MN 104 and the SN 106 can connect to a CN 110, which can be for example a 5G core network (5GC). The MN 104 and the SN 106 can support an NG interface to communicate with the CN 110. To directly exchange messages during the scenarios discussed below, the MN 104 and the SN 106 can support an Xn interface.

The cell(s) 114 associated with the MN 104 define or form an MCG, and the cell(s) 116 associated with the SN 106 define or form an SCG. In some implementations, the cell(s) 114 are EUTRA cells and the cell(s) 116 are NR cells. In other implementations, the cell(s) 114 are NR cells and the cells 116 are EUTRA cells. In further implementations, the cell(s) 114 and the cell(s) 116 are NR cells.

The UE 102 is equipped with processing hardware 120 that can include one or more general-purpose processors such as central processing units (CPUs) and non-transitory computer-readable memory storing machine-readable instructions executable on the one or more general-purpose processors, and/or special-purpose processing units. The processing hardware 120 in an example implementation includes an RRC controller 122 that receives, stores in the memory of the UE 102, updates, and otherwise operates on an RRC configuration 124.

Because a base station can operate as an MN or an SN in different scenarios, the MN 104 and the SN 106 can implement similar sets of functions and support both MN and SN operations. As illustrated in FIG. 1, the MN 104 is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes an RRC resource manager 132. The SN 106 is equipped with processing hardware 140 that also can include one or more general-purpose processors such as CPUs and non-transitory computer-readable memory storing machine-readable instructions executable on the one or more general-purpose processors, and/or special-purpose processing units. The processing hardware 140 in an example implementation includes an RRC resource manager 142.

In operation, the UE 102 communicates in DC with the MN 104 and the SN 106, in accordance with a certain RRC configuration. The UE 102 uses at least one radio bearer, which can be a split bearer, to communicate with the SN. After the SN 106 detects traffic inactivity of the UE 102 on the radio bearer, the MN 104 and/or the SN 106 efficiently release the radio resources of the UE 102 and reduce or eliminate entirely the delay associated with reconfiguration the radio connection between the UE 102 and the RAN 108 (e.g., the RRC configuration). Further, the MN 104 and/or the SN 106 efficiently manage the logical resources such as higher-layer bearer configuration at the SN 106 and reduce or eliminate entirely the delay associated with releasing these resources.

Next, example techniques for efficiently releasing the radio resources of the UE 102 are discussed are with reference to FIGS. 2-5, followed by a discussion of example techniques for managing bearer resources at the SN 106 with reference to FIGS. 6-10.

Figure 2:
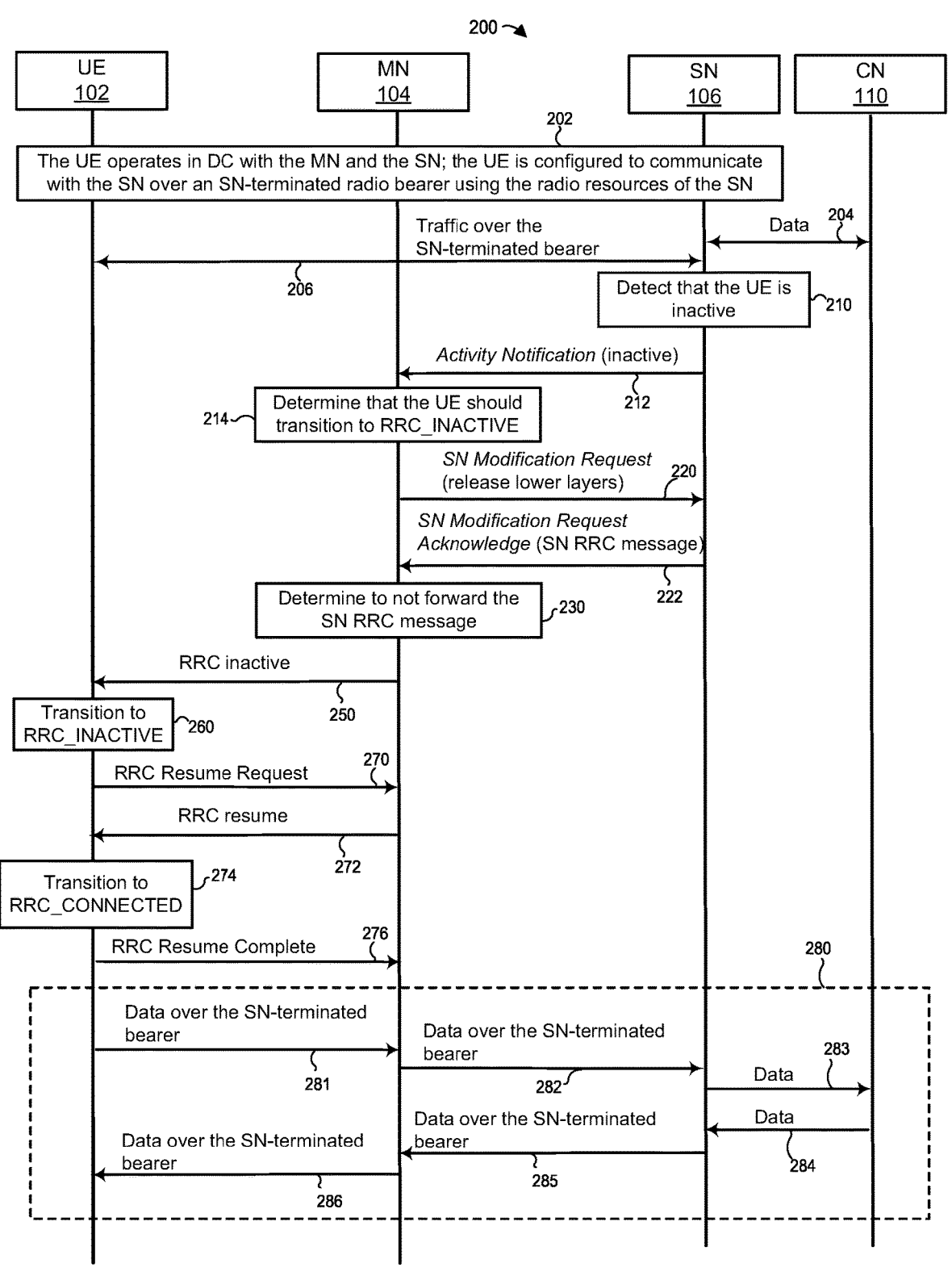
FIG. 2 is a messaging diagram of an example scenario in which the MN of FIG. 1 determines to not forward an RRC message from the SN to the UE, when the UE is to a transition from the connected state to the inactive state.

Referring first to FIG. 2, the UE 102 in an example scenario 200 operates 202 in MR-DC with the MN 104 and the SN 106. The UE 102 operates 202 in a connected state associated with a protocol for controlling radio resources (e.g., RRC_CONNECTED). The UE 102 operates on at least one SN-terminated radio bearer (SN-terminated radio bearer(s)) that includes radio resources of the SN 106. The SN-terminated radio bearer(s) can include an SRB and/or DRB(s). For example, the UE 102 can transmit 206 PDCP PDUs, RRC messages, IP packets, or other traffic to the SN 106 via the SN-terminated radio bearer(s) in the uplink (UE 102 to the RAN 108) direction using radio resources of the SN 106 or the MN 104. Depending on the whether the traffic is associated with the user plane or the control plane, the SN 106 processes the uplink traffic (e.g., RRC messages), forwards the traffic to the CN 110 (e.g., IP packets), or transmits 204 the traffic to another node. In the downlink direction, the SN 106 can originate (e.g., RRC messages), receive 204 from the CN 110, or receive from another node downlink traffic for the UE 102, and transmit 206 the downlink traffic 206 via the SN-terminated radio bearer(s) over the radio interface of the SN 106. The traffic can be associated with the user plane or the control plane.

To support the MR-DC operation at event 202, the SN 106 can transmit to the UE 102 at least one radio bearer configuration (e.g., a RadioBearerConfig information element (IE))) via the MN 104. The at least one radio bearer configuration can include configuration for the SN-terminated radio bearer(s). In other words, the SN 106 transmits the radio bearer configuration to the MN 104, and the MN 104 then transmits the at least one radio bearer configuration to the UE 102. The SN 106 also can transmit to the UE 102 a cell group configuration (e.g., a CellGroupConfig IE or an RRCConnectionReconfiguration message) via the MN 106. The cell group configuration can configure the radio resources of the SN 106. Similar to the example above, the SN 106 transmits the cell group configuration to the MN 104, and the MN 104 transmits the cell group configuration to the UE 102. The SN 106 optionally can update the cell group configuration for the UE 102 via the radio resources (e.g., a SRB3) of the SN 106 or via radio resources of the MN 104 (e.g., a SRB1). In some implementations, the cell group configuration can configure a medium access control

6

(MAC) entity, a logical channel with an associated radio link control (RLC) entity, and/or a primary secondary cell (PS-Cell).

At some point, the SN 106 detects 210 that the traffic of the UE 102 is inactive on the SN-terminated radio bearer(s). For example, the SN 106 can detect 210 the inactivity of traffic on the SN-terminated radio bearer(s) because the SN 106 does not have downlink PDCP PDU, RRC messages, IP packets, etc. to transmit to the UE 102 over the SN-terminated radio bearer(s), nor does the SN 106 receive any uplink PDCP PDU, RRC messages, IP packets, etc. from the UE 102 over the SN-terminated radio bearer(s) for a specified period of time. In another example, the SN 106 detects 210 that the traffic of the UE 102 is inactive on all of the SN-terminated radio bearer(s). The SN 106 can detect 210 the inactivity of traffic on all of the SN-terminated radio bearer(s) because, over all of the SN-terminated radio bearer(s), the SN 106 does not have downlink PDCP PDU, RRC messages, IP packets, etc. to transmit to the UE 102, nor does the SN 106 receive any uplink PDCP PDU, RRC messages, IP packets, etc. from the UE 102 over any of the SN-terminated radio bearer(s) for a specified period of time.

In response to detecting 210 the inactivity of traffic, the SN 106 sends 212 an Activity Notification message to the MN 104, indicating that the traffic of the UE 102 is inactive on all the SN-terminated radio bearer(s) or on each of the SN-terminated radio bearer(s). After receiving 212 the Activity Notification message, the MN 104 determines 214 that the UE 102 should transition to the RRC_INACTIVE state. The MN 104 in some scenarios determines that the UE 102 should transition to the RRC_INACTIVE state only upon determining that the traffic of the UE is also inactive on the radio bearer(s) terminated at the MN 104 (in other words, if the UE 102 is not communicating traffic with either the MN 104 or the SN 106). In response to this determination, or in response to receiving 212 the Activity Notification message, the MN 104 transmits 220 to the SN 106 an SN Modification Request message (as a more specific example, an S-Node Modification Request message) for the UE 102. The SN Modification Request message includes an indication that the SN 106 should release lower layers of the SN-terminated radio bearer(s). For example, the SN Modification Request message can indicate that the SN 106 should release the resources of the PHY layer, the MAC layer, and/or the RLC layer.

In response to receiving 220 this message, the SN 106 releases the lower layers of the SN-terminated radio bearer(s) and transmits 222 an SN Modification Request Acknowledge message to the MN 104 (as a more specific example, an S-Node Modification Request Acknowledge message).

According to the implementation of FIG. 2, the SN Modification Request Acknowledge message includes an SN RRC message for the UE 102. However, the MN 104 determines 530 to not transmit the SN RRC message to the UE 102. The MN 104 instead can discard the received SN RRC message.

The SN RRC message can include RRC reconfiguration IE(s). For example, the SN RRC message can be an RRCReconfiguration message when the SN 106 is implemented as a gNB. When the SN 106 is implemented as an ng-eNB, the SN RRC message can be a RRCConnectionReconfiguration message.

In response to determining 214 that the UE 102 should transition to the RRC_INACTIVE state, the MN 104 transmits 250 an RRC inactive message to the UE 102, in order to instruct the UE 102 to transition to RRC_INACTIVE state. In some implementations, the MN 104 transmits the RRC inactive message upon transmitting 220 the SN Modification Request message or upon receiving 222 the SN Modification Request Acknowledge message. In other implementations, the MN 104 transmits the RRC inactive message prior to transmitting 220 the SN Modification Request message or receiving 222 the SN Modification Request Acknowledge message.

The RRC inactive message can be an RRCRelease message when the MN 104 is implemented as a gNB. When the MN 102 is implemented as an ng-eNB, the RRC inactive message is implemented as an RRCConnectionRelease message. The RRC inactive message can include a suspend configuration (e.g., an SuspendConfig IE) or an inactive configuration (e.g., an InactiveConfig IE).

In response to receiving 250 the RRC inactive message, the UE 102 transitions 260 from the RRC_CONNECTED state to the RRC_INACTIVE state. Further, in response to receiving 250 the RRC inactive message or transitioning 260 to the RRC_INACTIVE state, the UE 102 suspends the RRC connection. More particularly, the UE 102 can suspend an SRB1, an SRB2, and the SN-terminated radio bearer(s) allocated to the UE 102. The UE 102 also suspends MN-terminated radio bearer(s) if the MN-terminated radio bearer(s) are configured. The UE 102 does not release the RRC connection, nor does the UE 102 release the at least one SN-terminated DRB.

In some cases (not illustrated in FIG. 2 to avoid clutter), the MN 104 can transmit to the SN 106 another SN Modification Request message (a "second SN Modification Request message") for the UE 102 while the UE 102 is in MR-DC with the MN 104 and the SN 106. The MN 104 can transmit the second request because the MN 104 performs coordination of radio resources of the MN 104 and the SN 106 for the UE 102, modifies radio resources of the SN 106 for the UE 102, or establishes, modifies or releases bearer context(s) of the UE 102. To this end, the SN 106 includes a SN RRC message in the second SN Modification Request Acknowledge message. In response to receiving the second SN Modification Request message, the SN 106 transmits a second SN Modification Request Acknowledge message to the MN 104. Because the MN 104 does not determine at this time to cause the UE 102 to transition to the RRC_INACTIVE state, the MN 104 transmits to the UE 102 the SN RRC message received in the second SN Modification Request Acknowledge message. Further, in some implementations, the MN 104 includes the SN RRC message in an RRC reconfiguration message and transmits the RRC reconfiguration message to the UE 102. In response, the UE 102 includes a SN RRC response message in an RRC reconfiguration complete message and transmits the RRC reconfiguration complete message to the MN 104. The SN RRC message can be a RRCReconfiguration message when the SN 106 is implemented as a gNB. When the SN 106 is implemented as an ng-eNB, the SN RRC message can be a RRCConnectionReconfiguration message. When the MN is implemented as a gNB, the RRC reconfiguration message can be an RRCReconfiguration message, and the RRC reconfiguration complete message can be an RRCReconfigurationComplete message. When the MN 104 is implemented as an ng-eNB, the RRC reconfiguration message can be an RRCConnectionReconfiguration message, and the RRC reconfiguration complete message can be an RRCConnectionReconfigurationComplete message.

Thus, the MN 104 determines 230 to not transmit the SN RRC message to the UE 102 in some cases (e.g., when the MN 104 also determines 204 that the UE 102 should transition to the RRC_INACTIVE state), but not in every instance where the MN 104 receives an SN RRC message for the UE 102 from the SN 106.

With continued reference to FIG. 2, the UE 102 operating in the RRC_INACTIVE state can determine to transition back to the RRC_CONNECTED state. To this end, the UE 102 can initiate an RRC resume procedure by transmitting 270 an RRC resume request message to the MN 104. In response, the MN 104 transmits 272 to the UE 102 an RRC resume message. The UE 102 transitions 274 to the RRC_CONNECTED state and transmits 276 to the MN 104 an RRC resume complete message, in response to receiving 272 the RRC resume message. The UE 102 resumes the suspended SN-terminated radio bearer(s) in response to the RRC resume message and begins to communicate with the SN via the SN-terminated radio bearer(s). In some implementations, the UE 102 resumes the suspended SRB1 to receive the RRC resume message on the SRB1 and resumes the suspended SRB2 in response to the RRC resume message. The UE 102 also resumes MN-terminated radio bearer(s) if the MN-terminated radio bearer(s) are configured and suspended.

In some implementations, the UE 102 releases the cell group configuration in response to 250 receiving the RRC inactive message, receiving 272 the RRC resume message, or transmitting 270 the RRC resume request message. In some implementations, the UE 102 releases the cell group configuration in response to transmitting 276 the RRC resume complete message.

When the MN 104 is implemented as an ng-eNB, the RRC resume request message can be an RRCConnectionResumeRequest message, the RRC resume message can be an RRCConnectionResume message, and the RRC resume complete message can be an RRCConnectionResumeComplete message. When the MN is implemented as a gNB, the RRC resume request message can be an RRCResumeRequest message, the RRC resume message can be an RRCResume message, and the RRC resume complete message can be an RRCResumeComplete message.

After transmitting 276 the RRC resume complete message, the UE 102 can communicate 280 with the CN 110 over the SN-terminated bearer(s), using the radio resources of the MN 104. In particular, because SN 106 has released lower layers of the SN-terminated bearer(s) (see event 220), and because the UE 102 has not released the SN-terminated radio bearer(s), the UE 102 transmits 281 uplink data over the SN-terminated radio bearer(s) using the radio resources of the MN 104, the MN 104 forwards 282 the data to the SN 106, and the SN 106 further forwards 283 the uplink data to the CN 110. In the downlink direction, the SN 106 receives 284 downlink data from the CN 110, forwards 285 the downlink data to the MN 104, and the MN 104 transmits 286 the downlink data to the UE 102 over the SN-terminated bearer(s) using the radio resources of the MN 104.

Figure 3:
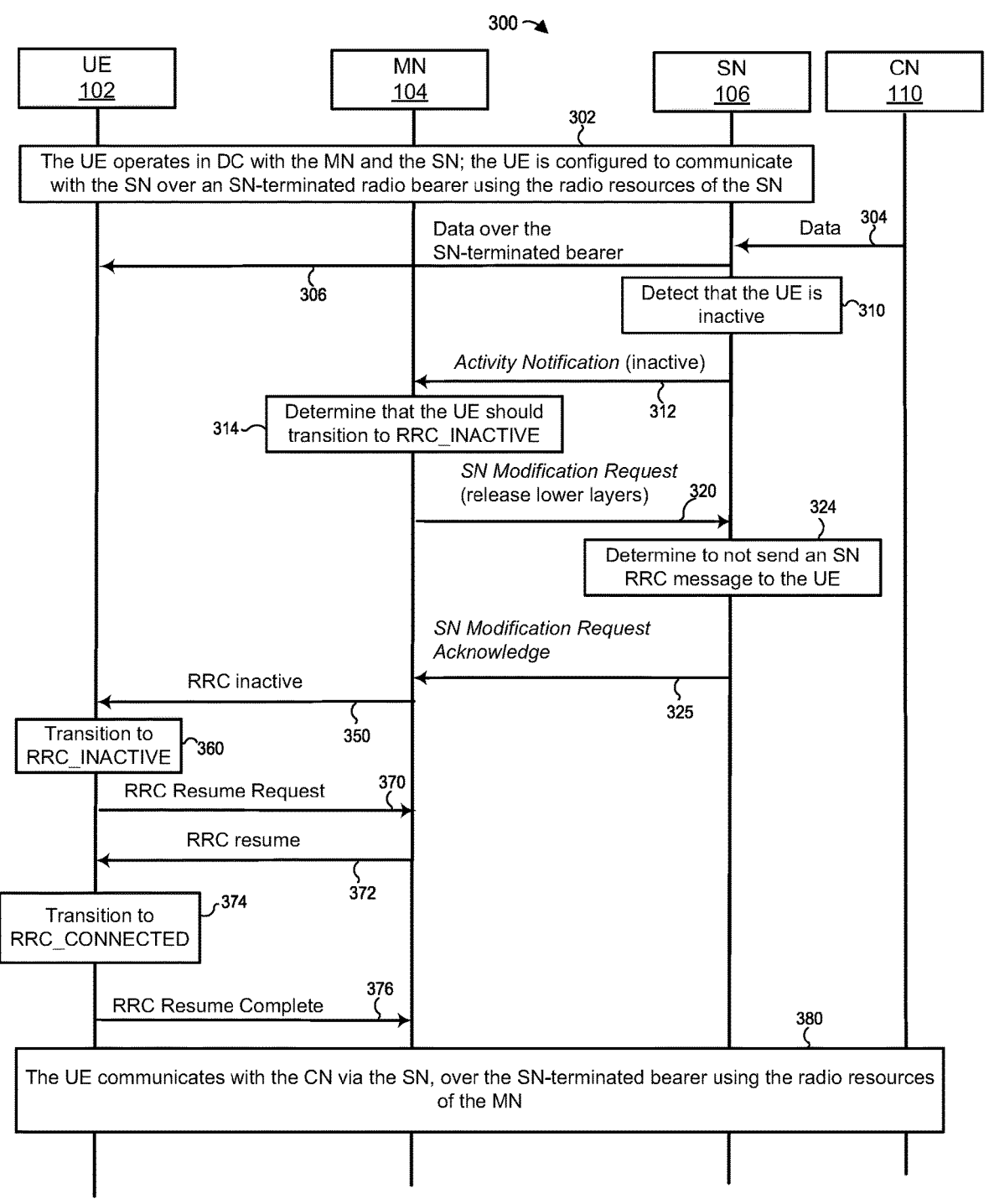
FIG. 3 is a messaging diagram of an example scenario in which the SN of FIG. 1 determines to not send, via the MN, an RRC message to the UE, when the UE is to a transition from the connected state to the inactive state.

FIG. 3 illustrates a generally similar scenario 300 in which the RAN 108 does not transmit an SN RRC message to the UE 102 when the UE 102 is to transition from the RRC_CONNECTED state to the RRC_INACTIVE state, but in this implementation the SN 106 omits the SN RRC message from the corresponding message to the MN 104.

Events labeled with the same lower two digits in FIGS. 2 and 3 (e.g., 202 and 302, or 250 and 350) are similar and are not discussed below. The variations of the scenario 200 discussed above (e.g., receiving the second SN Modification Request message, different timing of transmitting the RRC inactive message, different implementations of the SN RRC message) also apply to the scenario 300, and are not discussed again below.

In response to receiving 320 the SN Modification Request message, the SN 106 in this scenario determines 324 to not send an SN RRC message to the UE 102. The SN 106 accordingly transmits 325 an SN Modification Request Acknowledge message that does not include an SN RRC message to the MN 104. Similar to the scenario 200, the UE 102 in this case does not receive an SN RRC message that would not cause the UE 102 to reconfigure the radio connection between the UE 102 and the RAN 108.

Thus, as in the scenario 200, the UE 102 receives 350 an RRC inactive message and transitions to the RRC_INACTIVE state while the UE 102 still has the initial configuration of the radio connection between the UE 102 and the RAN 108, and has not received RRC reconfiguration IE(s) from the RAN 108 prior to transitioning to the RRC_INACTIVE state or after determining the UE 102 should transition to the RRC_INACTIVE state.

In contrast to the approach illustrated in FIGS. 2 and 3, if the MN 104 were to transmit an SN RRC message to the UE 102 and thereby initiate RRC reconfiguration according to the SN RRC message, the UE 102 later would send an SN RRC response message in response. The MN 104 would receive the SN RRC response message and configure the UE to transition to the RRC_INACTIVE state, by transmitting an RRC Release message, only after receiving the SN RRC response message (i.e., upon completing the RRC reconfiguration).

Figure 4:
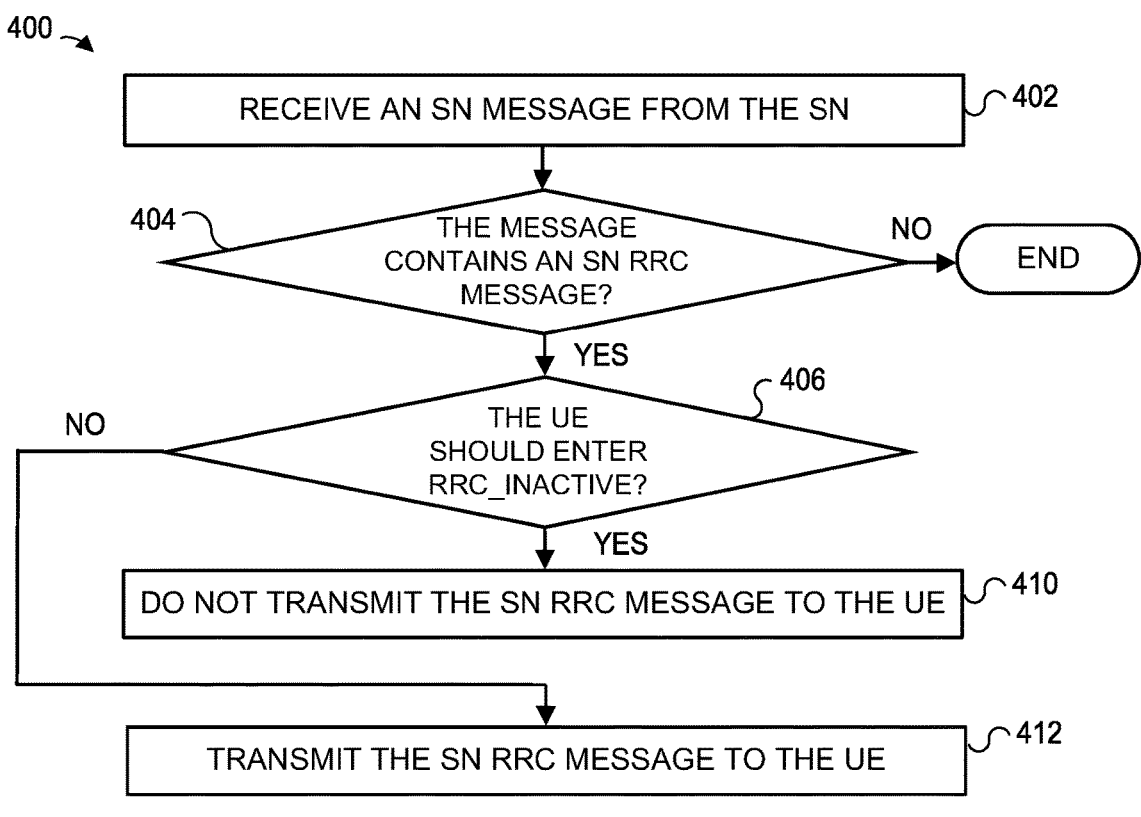
FIG. 4 is a flow diagram of an example method for determining whether to reconfigure the radio connection of a UE transitioning from the connected state to the inactive state, which can be implemented in the MN of FIG. 1.
Figure 5:
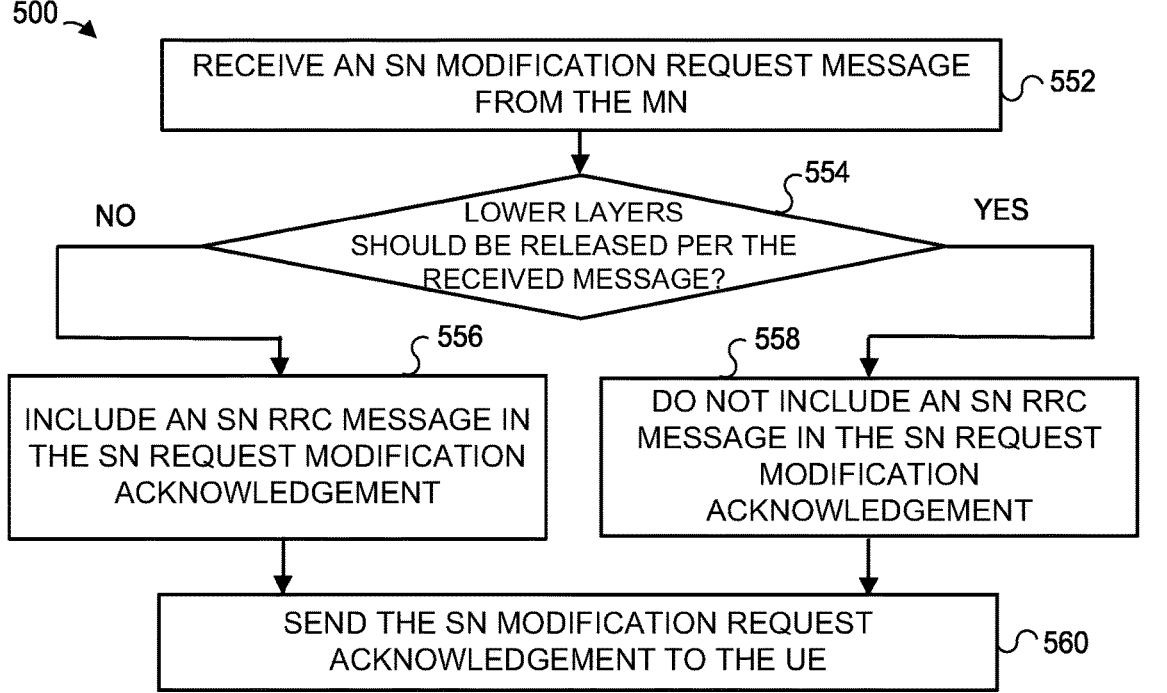
FIG. 5 is a flow diagram of an example method for determining whether to reconfigure the radio connection of a UE transitioning from the connected state to the inactive state, which can be implemented in the SN of FIG. 1.

For further clarity, FIGS. 4 and 5 illustrate flow diagrams of example respective methods 400, 500 for determining whether to reconfigure the radio connection of a UE transitioning from an connected state to an inactive state. The method 400 can be implemented in the MN 104 of FIG. 1, and the method 500 can be implemented in the SN 106 of FIG. 1, for example. For convenience, the methods 400 and 500 are discussed below with example reference to the UE 102, the MN 104, and the SN 106 of FIG. 1.

The method 400 begins at block 402, where the MN 104 receives an SN message from the SN 106 (see events 212, 312). At block 404, the MN 104 determines whether the SN message contains an SN RRC message for the UE 102. The method 400 completes if the received SN message does not contain an SN RRC message. Otherwise, if the MN 104 determines that the received SN message contains an SN RRC message for the UE 102, the flow proceeds to block 406.

At block 406, the MN 104 determines whether the UE 102 is to transition to the RRC_INACTIVE state. In the scenarios discussed above, the MN 104 can determine that the UE should transition to the RRC_INACIVE state as a part of event 214 or 314. If the MN 104 determines that the UE 102 should transition to the RRC_INACTIVE state, the flow proceeds to block 410, and the MN 104 does not transmit the SN RRC message to the UE 102 (see event 230). Otherwise, if the MN 104 determines that the UE 102 should not transition to the RRC_INACTIVE, the flow proceeds to block 412, and the MN 104 transmits the SN RRC message to the UE 102.

The method 500 begins at block 552, where the SN 106 receives an SN Modification Request message from the MN 104 (see events 220, 323). At block 554, the SN 106 determines whether the SN Modification Request indicates that the SN 106 should release the lower layers of the radio bearer. In various scenarios, the SN Modification Request message can request coordination of radio resources of the MN 104 and the SN 106 for the UE 102, modification of radio resources of the SN 106 for the UE 102, or establishment, modification or release of bearer context(s) of the UE 102.

If the received message does not indicate that the SN 106 should release the lower layers, the flow proceeds to block 556, where the SN 106 includes an SN RRC message in the SN Modification Request message. Otherwise, if the received message indicates that the SN 106 should release the lower layers, the flow proceeds to block 558, where the SN 106 formats an SN Modification Request message that does not include the SN RRC message (see event 324). The flow then proceeds from blocks 556 and 558 to block 560, where the SN 106 transmits the SN Modification Request message to the UE 102.

Next, several example techniques for managing bearer resources are considered with reference to FIGS. 6-10. In these scenarios, the RAN 108 (the MN 104 and/or the SN 106) configures an SN-terminated radio bearer to become MN-terminated, when the UE 102 operating in MR-DC is to transition to the RRC_INACTIVE state.

Referring first FIG. 6, events labeled with the same lower two digits in FIGS. 2, 3, and 6 (e.g., 202 and 602, or 374 and 674) are similar and are not discussed below.

After the MN 104 determines 614 that the UE 102 should transition to the RRC_INACTIVE state, or in response to receiving 612 an Activity Notification message, the MN 104 determines to reconfigure all SN-terminated radio bearer(s) of the UE 102 to be MN-terminated radio bearer(s). Alternatively, after the MN 104 determines 614 that the UE 102 should transition to the RRC_INACTIVE state, or in response to receiving 612 an Activity Notification message, the MN 104 determines to reconfigure some of the SN-terminated radio bearer(s) to be MN-terminated radio bearer(s) and releases the rest of the SN-terminated radio bearer(s). In response to this determination, the MN 104 sends 626 an SN request message (e.g., an S-Node Release Request message or an S-Node Modification Request message) for the UE 102 to the SN 106. In some implementations, the SN request message (e.g., an S-Node Modification Request) indicates that the SN 106 should release all of the SN-terminated radio bearer(s), or notify the SN 106 that the MN 104 has reconfigured all of the SN-terminated radio bearer(s) of the UE 102 to be MN-terminated radio bearer(s). In some implementations, all of the SN-terminated radio bearer(s) are DRB(s). If the SN 106 configures an SRB3 to the UE 102, the SN 106 may release the SRB3 in response to the SN request message.

In response to receiving 626 the SN request message, the SN 106 releases all of the SN-terminated radio bearer(s) or stops communicating data over all of the SN-terminated radio bearer(s). In other implementations, the SN request message (e.g., an S-Node Release Request message) indicates that the SN 106 should release the SN 106 for the UE 102 (in other words, indicate the SN 106 no longer serves the UE 102 in DC). In response to receiving 626 the SN request message, the SN 106 releases all of the SN-terminated radio bearer(s) and radio resources for the UE or stops communicating data over all of the SN-terminated radio bearer(s).

The SN 106 transmits 627 to the MN 104 an SN request acknowledge message (e.g., an S-Node Modification Request Acknowledge or an S-Node Release Request Acknowledge message) in response to the SN request message. In some implementations, the SN 106 does not include an SN RRC message in the SN request acknowledge message.

The MN 104 then transmits 642 to the UE 102 an RRC reconfiguration message in order to reconfigure all of the SN-terminated radio bearer(s) to be MN-terminated radio bearer(s). Alternatively, the MN 104 then transmits 642 to the UE 102 the RRC reconfiguration message in order to reconfigure some (but not all) of the SN-terminated radio bearer(s) to be MN-terminated radio bearer(s) and release the rest of the SN-terminated radio bearer(s). After the UE reconfigures 644 some or all of the SN-terminated radio bearer(s) to be MN-terminated, the UE transmits 646 an RRC reconfiguration complete message. The MN 104 then receives 646 the RRC reconfiguration complete message from the UE 102, in response to the RRC reconfiguration message. The MN 104 then transmits 650 the RRC inactive message to the UE 102, similar to event 250 discussed above. In one implementation, the UE 102 may release the SRB3 in response to the RRC reconfiguration message if the SN 106 configures the SRB3 to the UE 102.

In some implementations, the MN 104 transmits 642 the RRC reconfiguration message after transmitting 626 the SN request message or receiving 627 the SN Request Acknowledge message. In other implementations, the MN 104 transmits 626 the RRC reconfiguration message prior to transmitting 626 the SN Request message or receiving 627 the SN Request Acknowledge message.

Further, the RRC inactive message (event 650) in some implementations also supports reconfiguring all of the SN-terminated radio bearer(s) to be MN-terminated radio bearer(s). In this case, the MN 104 transmits to the UE 102 an RRC inactive message configuring the UE to enter RRC_INACTIVE state as well as to reconfigure all of the SN-terminated radio bearer(s) to be MN-terminated radio bearer(s). Alternatively, the RRC inactive message (event 650) in some implementations also supports reconfiguring some of the SN-terminated radio bearer(s) to be MN-terminated radio bearer(s) and releases the rest of the SN-terminated radio bearer(s). In this case, the MN 104 transmits to the UE 102 an RRC inactive message configuring the UE to enter RRC_INACTIVE state as well as to reconfigure some of the SN-terminated radio bearer(s) to be MN-terminated radio bearer(s) and release the rest of the SN-terminated radio bearer(s). The MN 104 in these "combination reconfiguration and RRC inactive" cases does not need to transmit the RRC reconfiguration message (event 642) in addition to transmitting 750 the RRC inactive message that includes reconfiguration and/or release instructions. Also, the MN 104 in some implementations transmits 650 the RRC inactive message after transmitting 626 the SN request message or receiving 627 the SN request acknowledge message. In other implementations, the MN 104 transmits 650 the RRC inactive message prior to transmitting 626 the SN request message or receiving 627 the SN request acknowledge message.

Similar to the scenarios of FIGS. 2 and 3, in response to receiving 650 the RRC inactive message, the UE 102 transitions 660 to the RRC_INACTIVE state and suspends the RRC connection. The UE 102 does not release the RRC connection, nor does the UE 102 release the at least one SN-terminated DRB. In one implementation, the UE 102 may release the SRB3 in response to the RRC inactive message if the SN 106 configures the SRB3 to the UE 102.

After the UE 102 operating in the RRC_INACTIVE state determines to transition back to the RRC_CONNECTED state, the UE 102 can initiate an RRC resume procedure by transmitting 670 an RRC resume request message to the MN 104. The MN 104 transmits 672 to the UE 102 an RRC resume message to resume the suspended MN-terminated radio bearer(s) in response to the RRC resume request message. The UE transmits 676 the MN an RRC resume complete message in response to the RRC resume message. The UE 102 resumes the suspended MN-terminated radio bearer(s) in response to the RRC resume message and communicates 690 with the MN via the MN-terminated radio bearer(s).

Unlike event 280 or 380, where the UE 102 communicates over SN-terminated radio bearer(s) using the radio resources of the MN 104, here the UE 102 transmits 691 uplink data over the MN-terminated radio bearer(s) using the radio resources of the MN 104, and the MN 104 forwards 692 the uplink data to the CN 110. In downlink direction, the MN 104 receives 694 downlink data from the CN 110 and transmits 693 the downlink data to the UE 102 over the MN-terminated radio bearer(s) using the radio resources of the MN 104.

Now referring to a scenario 700 of FIG. 7, events labeled with the same lower two digits in FIGS. 2, 3, 6, and 7 (e.g., 202 and 702, or 674 and 774) are similar and are not discussed below.

The SN 106 detects 711 that the traffic of the UE 102 is inactive on the radio bearer, similar to event 210. However, the SN 106 also determines 711 that the SN 106 should no longer serve the UE 102 in DC, accordingly release the SN 106 for the UE 102. The SN 106 accordingly transmits 728 to the MN 104 an SN Release Required message (e.g., an S-Node Release Required message) to require releasing the SN 106 for the UE 102.

In response to receiving 728 the SN Release Required message, the MN 104 transmits 729 an SN Release Confirm message (e.g., an S-Node Release Confirm message) to the SN 106. After receiving 728 the SN Release Required message or transmitting 729 the SN Release Confirm message, the MN 104 determines 732 in some implementations to reconfigure all SN-terminated radio bearer(s) of the UE 102 to be MN-terminated radio bearer(s). Alternatively, after receiving 728 the SN Release Required message or transmitting 729 the SN Release Confirm message, the MN 104 determines to reconfigure some of the SN-terminated radio bearer(s) to be MN-terminated radio bearer(s) and release the rest of the SN-terminated radio bearer(s).

In response to this determination 732, in some implementations the MN 104 transmits 743 to the UE 102 an RRC reconfiguration message to reconfigure all of the SN-terminated radio bearer(s) to be MN-terminated radio bearer(s) and receives 746 an RRC reconfiguration complete message from the UE 102 in response. In some implementations, all of the SN-terminated radio bearer(s) are DRB(s). In one implementation, the UE 102 may release the SRB3 in response to the RRC reconfiguration message if the SN 106 configures the SRB3 to the UE 102.

The MN 104 then determines 714 to cause the UE 102 to transition to the RRC_INACTIVE state and transmits 750 to the UE an RRC inactive message that configures the UE to enter RRC_INACTIVE state. In some implementations, the MN 104 transmits 750 the RRC reconfiguration message after receiving 728 the SN Release Required message or transmitting 729 the SN Required Confirm message. In some implementations, the RRC inactive message also supports reconfiguration of all of the SN-terminated radio bearer(s) to be MN-terminated radio bearer(s). Alternatively, the RRC inactive message (event 650) in some implementations supports reconfiguring some of the SN-terminated radio bearer(s) to be MN-terminated radio bearer(s) and releases the rest of the SN-terminated radio bearer(s). In this case, the MN 104 transmits to the UE 102 an RRC inactive message configuring the UE to enter RRC_INACTIVE state as well as to reconfigure some of the SN-terminated radio bearer(s) to be MN-terminated radio bearer(s) and release the rest of the SN-terminated radio bearer(s). In these cases, the MN 104 transmits 750 to the UE 102 an RRC inactive message configuring the UE to enter RRC_INACTIVE state as well as to reconfigure all of the SN-terminated radio bearer(s) to be MN-terminated radio bearer(s). In these "combination reconfiguration and RRC inactive" cases, there is no need for the MN 104 to also transmit 743 the separate RRC reconfiguration message in addition to transmitting 750 the RRC inactive message that includes reconfiguration and/or release instructions. In one implementation, the UE 102 may release the SRB3 in response to the RRC inactive message if the SN 106 configures the SRB3 to the UE 102.

Figure 7:
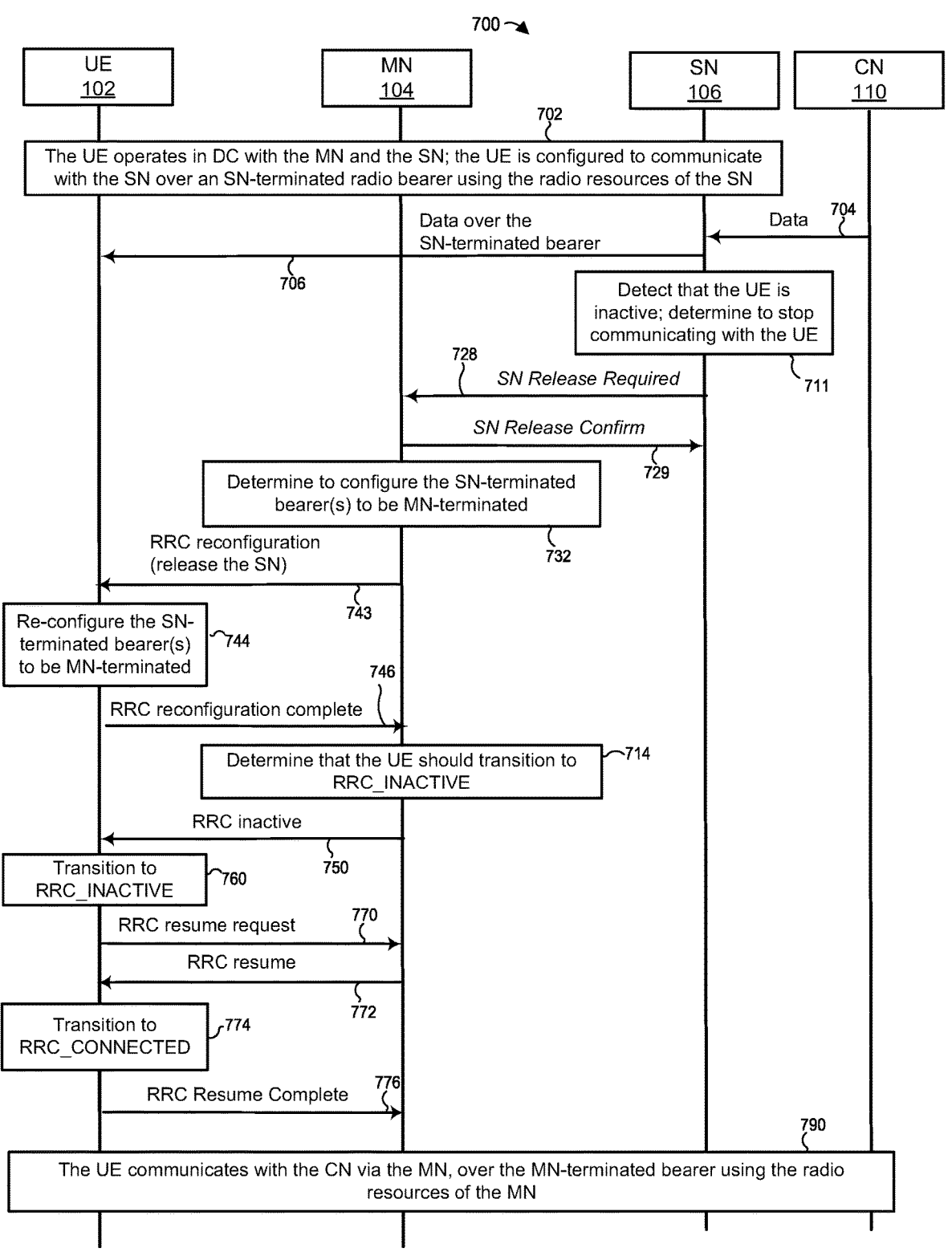
FIG. 7 is a messaging diagram of an example scenario in which the MN of FIG. 1 determines to reconfigure an SN-terminated radio bearer to be MN-terminated in response to the SN requesting a release, when the UE is to a transition from the connected state to the inactive state.
Figure 8:
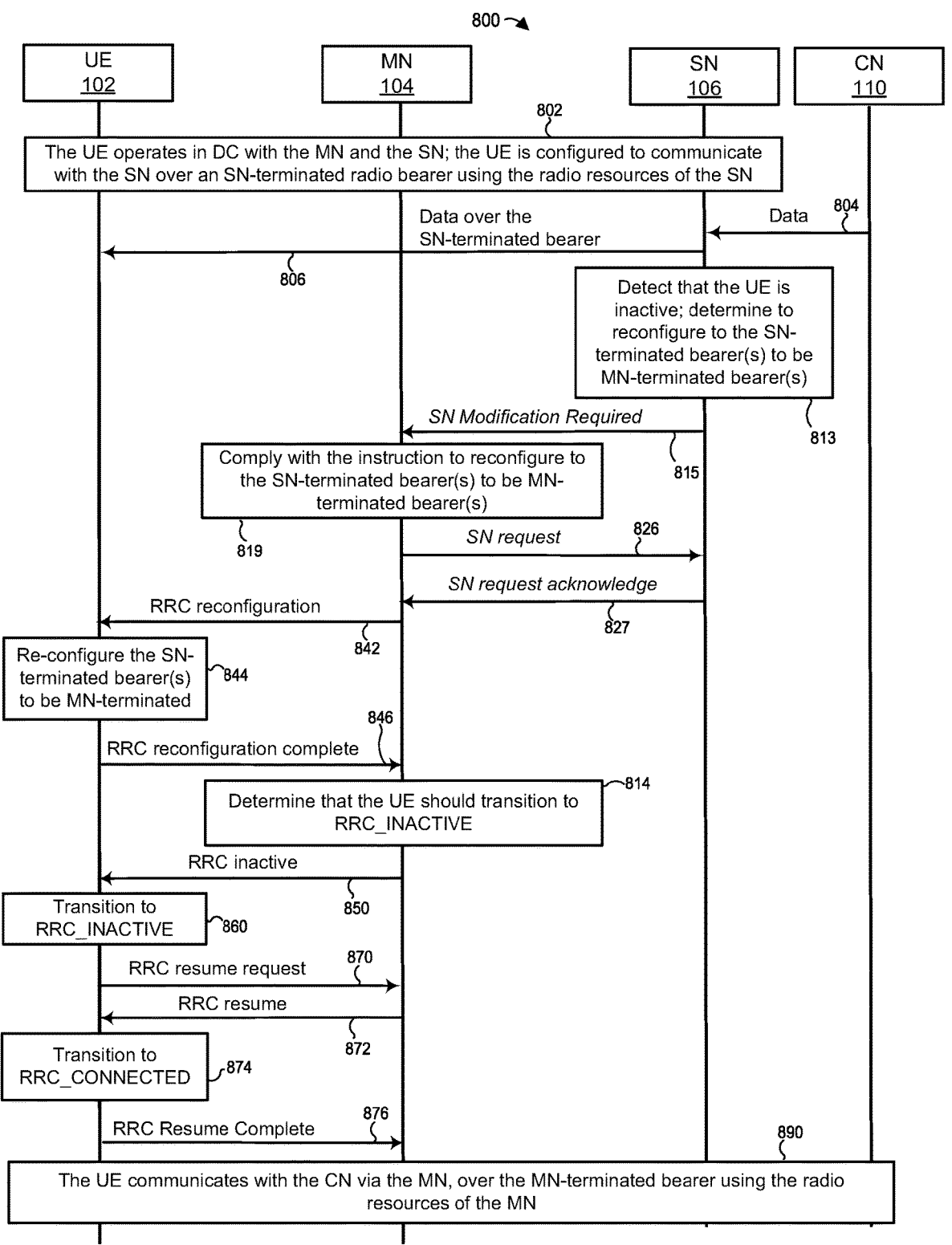
FIG. 8 is a messaging diagram of an example scenario in which the SN of FIG. 1 determines to reconfigure an SN-terminated radio bearer to be MN-terminated, when the UE is to a transition from the connected state to the inactive state.

Next, FIG. 8 illustrates another example scenario 800 in which the SN 106 initiates reconfiguration of an SN-terminated radio bearer to be MN-terminated. Events labeled with the same lower two digits in FIGS. 2, 3, and 6-8 (e.g., 202 and 802, or 674 and 874) are similar and are not discussed below.

The SN 106 detects 813 that the traffic of the UE 102 is inactive on the radio bearer, similar to event 210. However, the SN 106 also determines 813 to release all of the SN-terminated radio bearer(s) or modify all of the SN-terminated DRB(s) to be MN-terminated radio bearer(s). In some implementations, the SN-terminated radio bearer(s) may be DRB(s).

The SN 106 transmits 815 an SN Modification Required message to the MN 104. In response to receiving 815 the SN Modification Required message, the MN accepts 819 the request (or instruction) to reconfigure all SN-terminated radio bearer(s) of the UE 102 to be MN-terminated radio bearer(s). The MN 104 transmits 826 to the SN 106 an SN request message for the UE 102, so as to reconfigure all SN-terminated radio bearer(s) of the UE 102 to be MN-terminated radio bearer(s) or to reconfigure some the SN-terminated radio bearer(s) to be MN terminated radio bearer(s) and release the rest of the SN terminated radio bearer(s). In some implementations, the SN request message (e.g., an S-Node Modification Request message) indicates that the SN 106 should release all of the SN-terminated radio bearer(s), or that all of the SN-terminated radio bearer(s) should change to be MN-terminated radio bearer(s).

In response to receiving 826 the SN request message, the SN 106 releases all of the SN-terminated radio bearer(s) or stops communicating data over all of the SN-terminated radio bearer(s). In other implementations, the SN request message (e.g., S-Node Release Request) indicates the SN to release the SN for the UE (i.e., the SN does no longer serve the UE). In response to the SN request message, the SN releases all of the SN-terminated radio bearer(s) and radio resources for the UE or stops communicating data over all of the SN-terminated radio bearer(s). The SN 106 transmits 827 to the MN 104 an SN request acknowledge message. In some implementations, if the SN 106 configures a SRB3 to the UE 102, the SN 106 may release the SRB3 in response to the SN request message.

The MN 104 transmits 842 to the UE 102 an RRC reconfiguration message to reconfigure all of the at least one SN-terminated radio bearer(s) to be MN-terminated radio bearer(s) (s). The MN 104 in response receives 846 an RRC reconfiguration complete message from the UE 102. In one implementation, the UE 102 may release the SRB3 in response to the RRC reconfiguration message if the SN 106 configures the SRB3 to the UE 102.

Figure 6:
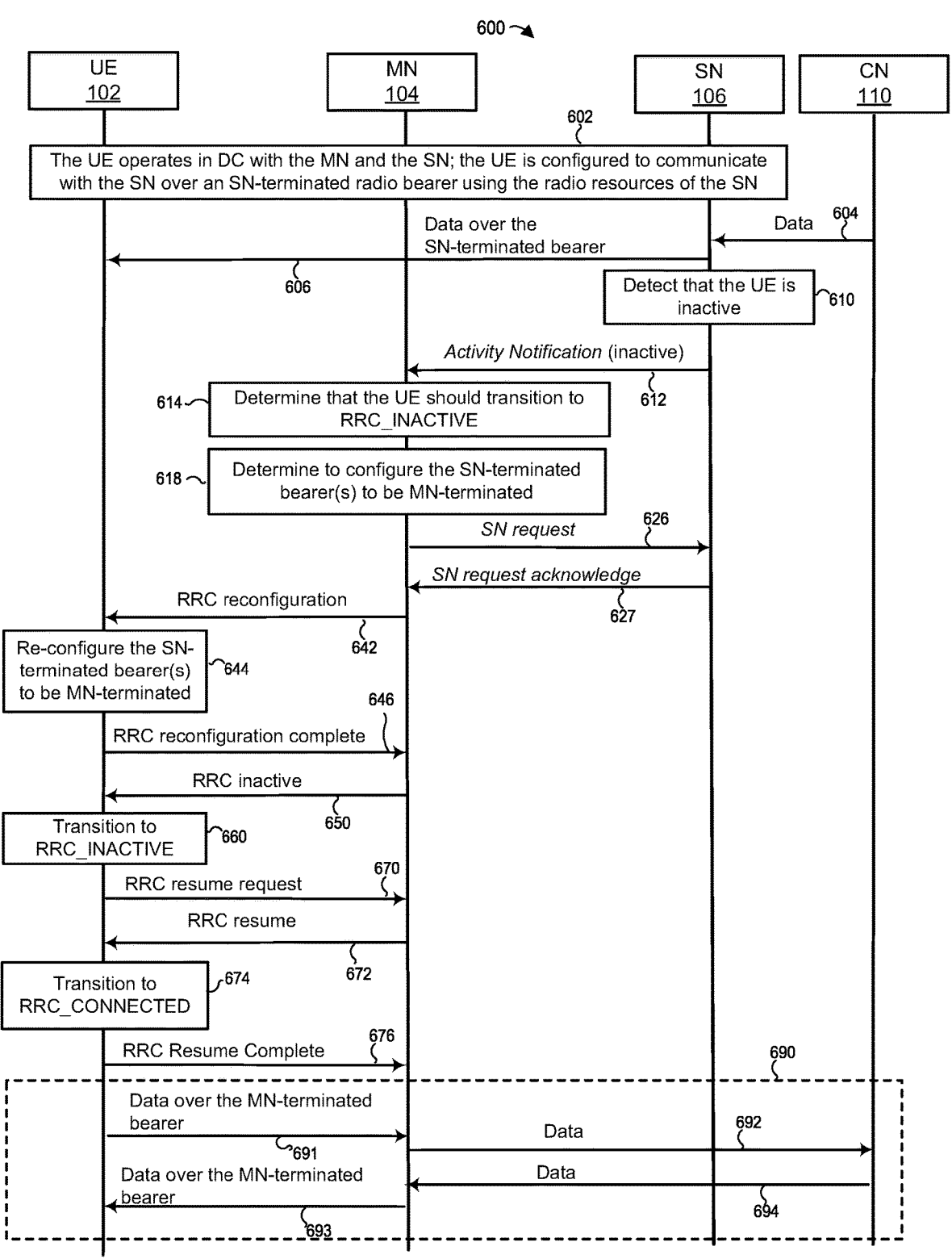
FIG. 6 is a messaging diagram of an example scenario in which the MN of FIG. 1 determines to reconfigure an SN-terminated radio bearer to be MN-terminated, when the UE is to a transition from the connected state to the inactive state.

In contrast to the approach illustrated in FIGS. 6-8, if the RAN 108 were to leave the radio bearer to be SN-terminated in a similar situation, and the UE 102 were to remain in the RRC_INACTIVE state for a relatively long period of time due to inactivity, the SN 106 would retain SN-terminated radio bearers for the duration of this period of time and thus unnecessarily consume the resources of the SN 106.

For further clarity, FIGS. 9 and 10 illustrates flow diagrams of example respective methods 900, 1000 for reconfiguring an SN-terminated radio bearer associated with a UE that is to transition from the connected state (e.g., RRC_CONNECTED) to the inactive state (e.g., RRC_INACTIVE). The method 900 can be implemented in the MN 104 of FIG. 1, and the method 1000 can be implemented in the SN 106 of FIG. 1, for example. For convenience, the methods 900 and 1000 are discussed below with example reference to the UE 102, the MN 104, and the SN 106 of FIG. 1.

At block 920, the MN 104 receives an indication from the SN 106 that traffic of the UE 102 is inactive on the SN-terminated radio bearer(s) (see event 612) or an indication that the SN 106 requires a release from the DC operation with the UE 102 (see event 728). Next, at block 922, the MN 104 determines to reconfigure the SN-terminated radio bearer(s) to be MN-terminated radio bearer(s) (see events 618, 732). At block 924, the MN 104 reconfigures the UE 102 accordingly (see events 642, 743). At block 926, the MN 104 causes the UE 103 to transition to the inactive state, e.g., RRC_INACTIVE (see events 650, 750).

Referring to FIG. 10, at block 1072, the SN 106 detects that traffic of the UE 102 is inactive on SN-terminated radio bearer(s) and, at block 1074, determines to reconfigure the SN-terminated radio bearer(s) to be MN-terminated (see event 813). At block 1076, the SN 106 sends an indication that an SN modification is required, to the MN 104 (see even 815).

Finally, FIG. 11 illustrates a flow diagram of an example method 1100 for managing resources of a UE transitioning from the connected state to the inactive state. The method 1100 cab be implemented in the RAN 108 of FIG. 1 (e.g., in the MN 104 and/or the SN 106). For convenience, the method 1100 is discussed below with example reference to the MN 104 and the SN 106 operating in the RAN 108, and the UE 102 of FIG. 1.

The method 1100 begins at block 1102, where the RAN 108 configures the UE 102 to communicate with the SN 106 according to an initial configuration of the radio connection with the RAN 108 (e.g., initial RRC configuration), using SN-terminated radio bearer(s) (see events 202, 302, 602, 702, and 802). Next, at block 1104, the RAN 108 determines that the traffic of the UE 102 is inactive on the SN-terminated radio bearer(s) (see events 210, 310, 610, 711, 813).

Next, at block 1106, the RAN 108 determines whether to omit the reconfiguration of the radio connection with the UE 102 as discussed above with reference to FIGS. 2-4, or to use the reconfiguration with the UE 102 to make the SN-terminated radio bearer(s) be MN-terminated radio bearer(s), as discussed above with reference to FIGS. 6-8.

At block 1120, the RAN 108 causes the UE 102 to transition to the inactive state (e.g., RRC_INACTIVE) while the UE 102 still has the initial configuration of the radio connection, i.e., without transmitting RRC reconfiguration to the UE 102 (see events 230/272, and 324/372).

At block 1110, the RAN 108 reconfigures the SN radio bearer to be MN-terminated (see events 618/642/644, 732/743/744, 813/819/842/844 along with the accompanying text and variations). In some implementations, the RRC inactive message (see events 650, 750, and 850) includes reconfiguration and/or release instructions and thus a separate RRC reconfiguration message (see events 642, 743, 842) can be omitted. In some situations, the UE 102 may release the SRB3 in response to the RRC reconfiguration message if the SN 106 configures the SRB3 to the UE 102.

The following considerations apply to the discussion above.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

When implemented in software, the techniques can be provided as part of the operating system, a library used by multiple applications, a particular software application, etc. The software can be executed by one or more general-purpose processors or one or more special-purpose processors.

The following list of aspects reflects a variety of the embodiments explicitly contemplated by the present disclosure.

Aspect 1. A method in a base station operating as an MN for a UE communicating in DC with the MN and an SN, the method comprising: receiving, by one or more processors, a base station message from the SN including a second message for the UE, the second message associated with a protocol for controlling radio resources; determining, by the one or more processors, whether the UE should transition to an inactive state, from a connected state; in response to determining that the UE should not transition to the inactive state, transmitting the second message to the UE over a radio interface; and in response to determining that the UE should transition to the inactive state, transmitting a command to transition to the inactive state over the radio interface, including discarding the second message.

Aspect 2. The method of claim 1, wherein determining that the UE should transition to an inactive state includes receiving an indication from the SN that traffic of the UE is inactive on a radio bearer via which the UE communicates with the SN.

Aspect 3. A method in a base station operating as an SN for a UE communicating in DC with an MN and the SN, the method comprising: receiving, by one or more processors from the MN, a request to modify a radio connection between the UE and the SN; and generating, by the one or more processors, an acknowledgement message responsive to the request, including: in response to determining that the request does not include a command to release lower layers of the radio bearer, including in the acknowledgement message a second message to be forwarded to the UE, and in response to determining that the request includes a command to release the lower layers of the radio bearer, omitting the second message from the acknowledgement message.

Aspect 4. A method in a base station operating as an MN for a UE communicating in DC with the MN and an SN, the method comprising: receiving, by one or more processors, an indication the SN generated in response to detecting inactivity of the UE on an SN-terminated radio bearer; in response to receiving the indication, reconfiguring, by the one or more processors, the SN-terminated radio bearer to generate an MN-terminated radio bearer; and sending, by the one or more processors, reconfiguration information related to the MN-terminated radio bearer.

Aspect 5. The method of aspect 4, wherein the indication is an activity notification indicating that the UE is inactive on the radio bearer.

Aspect 6. The method of aspect 18, wherein the indication is an indication that a release of the SN is required.

Aspect 7. A method in a base station operating as an SN for a UE communicating in DC with an MN and the SN, the method comprising: detecting, by one or more processors, that the UE is inactive on an SN-terminated radio bearer; in response to the detecting, determining that the SN-terminated radio bearer should be reconfigured to be an MN-terminated radio bearer; and sending, by the one or more processors, an indication to the MN that a reconfiguration of the SN-terminated bearer is required.

Aspect 8. A base station comprising processing hardware and configured to implement a method of any of claims 1-7.

What is claimed is:

1. A method for managing resources associated with a user equipment (UE) operating in dual connectivity (DC) with a master node (MN) and a secondary node (SN) in accordance with an initial configuration of a radio connection between the UE and a radio access network (RAN), the method implemented in the MN and comprising:

detecting that traffic of the UE is inactive on a radio bearer via which the UE communicates with the SN;

in response to the detecting, sending, from the MN to the SN, a request to release lower layers of the radio bearer, the lower layers including a PHY layer and a MAC layer;

receiving, at the MN from the SN, an acknowledgement message, including omitting from the acknowledgement message a radio resource control (RRC) message with a reconfiguration for the radio connection; and in response to the detecting, sending to the UE a command to transition from a connected state to an inactive state in which the radio connection is suspended, while the UE operates in accordance with the initial configuration of the radio connection.

2. The method of claim 1, further comprising:

not sending to the UE a reconfiguration for the radio connection, after detecting that the UE is inactive on the radio bearer and prior to sending the command to UE.

3. The method of claim 1, further comprising:

resuming the suspended radio connection subsequently to sending the command to transition from the connected state to the inactive state; and providing lower layers for the radio bearer, to enable the UE to communicate with the SN over the radio bearer via the MN.

4. The method of claim 1, wherein the sending the request to release lower layers of the radio bearer occurs prior to the sending the command to the UE.

5. The method of claim 1, wherein the sending the request to release lower layers of the radio bearer occurs after the sending the command to the UE.

6. The method of claim 1, wherein configuring the radio bearer to be terminated only at the MN includes:

prior to sending the command, sending, from the MN to the UE, an RRC reconfiguration message.

7. The method of claim 6, wherein configuring the radio bearer to be terminated only at the MN includes:

receiving, by the MN from the SN, an activity notification indicating that the UE is inactive on the radio bearer, and determining, at the MN, to reconfigure the radio bearer in response to the activity notification.

8. The method of claim 7, further comprising, in response to the determining to reconfigure the radio bearer:

sending, from the MN to the SN, a request to reconfigure the radio bearer.

9. The method of claim 7, wherein configuring the radio bearer to be terminated only at the MN includes:

receiving, at the MN from the SN, an indication that a release of the SN is required, and determining, at the MN, to reconfigure the radio bearer in response to the indication.

10. The method of claim 7, wherein configuring the radio bearer to be terminated only at the MN includes:

receiving, at the MN from the SN, an indication that a reconfiguration of the radio bearer is required, and determining, at the MN, to reconfigure the radio bearer in response to the indication.

11. The method of claim 10, further comprising, in response to the determining to reconfigure the radio bearer:

sending, from the MN to the SN, an indication that the MN has accepted the requirement of the reconfiguration of the radio bearer.

12. A base station operating as a master node (MN) in dual connectivity (DC) communication with a user equipment (UE), with a second base station operating as a secondary node (SN) in the DC communication with the UE;

the MN configured to:

detect that traffic of the UE is inactive on a radio bearer via which the UE communicates with the SN, in response to the detecting, send, from the MN to the SN, a request to release lower layers of the radio bearer, the lower layers including a PHY layer and a MAC layer, receive, at the MN from the SN, an acknowledgement message, including omitting from the acknowledgement message a radio resource control (RRC) message with a reconfiguration for the radio connection, in response to the detecting, send to the UE, while the UE operates in accordance with the initial configuration of the radio connection, a command to transition from a connected state to an inactive state in which the radio connection is suspended.

13. The MN of claim 12, further configured to:

not send to the UE a reconfiguration for the radio connection, after detecting that the UE is inactive on the radio bearer and prior to sending the command to UE.

14. The MN of claim 12, further configured to:

resume the suspended radio connection subsequently to sending the command to transition from the connected state to the inactive state, and provide lower layers for the radio bearer, to enable the UE to communicate with the SN over the radio bearer via the MN.

15. The MN of claim 12, wherein sending the request to release lower layers of the radio bearer occurs prior to the sending the command to the UE.

16. The MN of claim 12, wherein the sending the request to release lower layers of the radio bearer occurs after the sending the command to the UE.

17. The MN of claim 12, wherein to configure the radio bearer to be terminated only at the MN, the RAN is configured to:

prior to sending the command, send, from the MN to the UE, an RRC reconfiguration message.

18. The MN of claim 17, wherein to configure the radio bearer to be terminated only at the MN, the RAN is configured to:

receive, by the MN from the SN, an activity notification indicating that the UE is inactive on the radio bearer, and determine, at the MN, to reconfigure the radio bearer in response to the activity notification.

19. The MN of claim 17, further configured to:

in response to the determining to reconfigure the radio bearer:

send, from the MN to the SN, a request to reconfigure the radio bearer.

20. The MN of claim 17, wherein to configure the radio bearer to be terminated only at the MN, the MN is configured to:

receive, at the MN from the SN, an indication that a release of the SN is required, and determine, at the MN, to reconfigure the radio bearer in response to the indication.

* * * * *